United States Patent
Wlassics et al.

(10) Patent No.: US 6,187,894 B1
(45) Date of Patent: Feb. 13, 2001

(54) PERFLUOROPOLYETHER ACYLPEROXIDES AND PROCESS FOR THEIR PREPARATION

(75) Inventors: Ivan Wlassics, Genoa; Vito Tortelli, Milan, both of (IT)

(73) Assignee: Ausimont S.p.A., Milan (IT)

( * ) Notice: Under 35 U.S.C. 154(b), the term of this patent shall be extended for 0 days.

(21) Appl. No.: 09/328,399

(22) Filed: Jun. 9, 1999

(30) Foreign Application Priority Data

Jun. 11, 1998 (IT) .............................................. MI98A1328

(51) Int. Cl.[7] .............................. C08G 65/00; C08G 8/02; C08G 14/00; C07C 409/00
(52) U.S. Cl. ........................ 528/125; 528/126; 528/174; 528/176; 568/560; 568/566
(58) Field of Search .................................... 528/125, 174, 528/176, 126; 568/560, 566

(56) References Cited

U.S. PATENT DOCUMENTS

| | | | | |
|---|---|---|---|---|
| 2,559,630 | * | 7/1951 | Bullitt | 568/560 |
| 3,461,155 | * | 8/1969 | Rice | 568/560 |
| 5,021,516 | * | 6/1991 | Wheland | 525/403 |
| 5,068,454 | * | 11/1991 | Sawada et al. | 568/566 |

FOREIGN PATENT DOCUMENTS

97/08142 3/1997 (WO) .

OTHER PUBLICATIONS

Hideo Sawada, "Fluorinated Organic Peroxides Their Decomposition Behavior and Applications", *Tsukuba Research Laboratory*, pp. 300–326, 1993. The month in the date of publication is not available.

* cited by examiner

Primary Examiner—P. Hampton-Hightower
(74) Attorney, Agent, or Firm—Arent, Fox, Kintner, Plotkin & Kahn

(57) ABSTRACT

Perfluoroether acylperoxides having an average equivalent weight in the range of 350–5000, and of the following formulae:

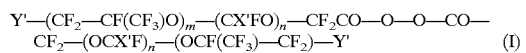

(I)

wherein $Y'=Cl, OR_f$ wherein $R_f$ is a $C_1$–$C_3$ perfluoroalkyl;

m, n are integers such that the average equivalent weight of (I) is in the range of 350–5000 and $m/n \geq 40$;

$X'=F, CF_3$;

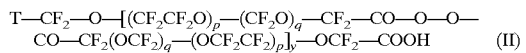

(II)

wherein y is an integer comprised between 1 and 5;

p and q are integers such as to give the above mentioned EW and p/q=0.5 to 2.0;

T=COOH, F with the proviso that when T=COOH y=1–5, when T=F then y=1, and processes for manufacturing them.

10 Claims, No Drawings

PERFLUOROPOLYETHER ACYLPEROXIDES AND PROCESS FOR THEIR PREPARATION

The present invention relates to an improved process to obtain with high yields poly- and diacyl-peroxides of (per)-fluoropolyethers starting from the corresponding diacyl- and monoacyl-halides.

Perfluoroether diacylperoxide syntheses have already been described in the art.

H. Sawada in Reviews of Heteroatom Chemistry Vol. 8, pages 205–231 mentions a perfluoro-oxa-alkanoyl peroxides series of formula $(R_{fa}CO_2)_2$, wherein $R_{fa}=C_3F_7O[CF(CF_3)CF_2O]_mCF(CF_3)$ and m=0, 1, 2, 3, and reports that the behaviour to thermal decomposition and their uses are known. Specifically it is reported that the synthesis takes place in aqueous alkales in the presence of hydrogen peroxide. No indication is given how the reaction is carried out.

WO 97/08142 describes a process to obtain diacylperoxides starting from halogen derivatives of formula R(C=O)X wherein X=halogen and R can be in particular the following perfluoropolyether group:

wherein w1, x1, y1, z1 are integers, w1 ranges from 0 to 8, x1 from 0 to 1, y1 from 0 to 7, z1 from 0 to 1, w1+x1+y1+z1≧1, and G is fluorine or a substituted carbon atom. The reaction, which can be carried out in batch or in a continuous way in a stable peroxide dispersion in $KOH/H_2O_2$ which contains the acylic halide, occurs in very short times, from few seconds to 30 seconds, under stirring such that the Reynolds number results in the range 1.000–40.000. Fluorinated and non fluorinated organic solvents and surfactants can be added. The examples relate to the synthesis of the perf luoroether diacylperoxide having a low molecular weight from HFPO having the formula $[CF_3CF_2CF_2OCF(CF_3)(C=O)O]_2$ (equivalent weight 332), starting from the corresponding acylfluoride. The reactions are generally carried out at 0° C. but also at room temperature. The contact time generally ranges, as said, from 1 to 30 seconds. The patent application reports also the peroxide synthesis starting from the following acylfluoride having the formula

having molecular weight of about 1300. The yield is 62%. Moreover, the process uses solvents having high ODP (e.g. $CFCH_3$, $CF_2Cl-CFCl_2$).

An object of the present invention is a process to obtain with improved yields (per)fluoroether acylperoxides having an average equivalent weight (EW) in the range 350–5.000, having formula:

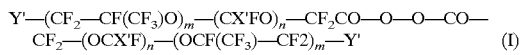

wherein

Y'=Cl, $OR_f$ wherein $R_f$ is a $C_1$–$C_3$ perfluoroalkyl;

m, n are integers such that (I) gives the mentioned EW and m/n≧40;

X'=F, $CF_3$;

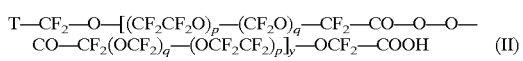

wherein y is an integer comprised between 1 and 5;

p and q are integers such as to give the above mentioned EW and p/q=0.5–2.0;

T=COOH, F with the proviso that if T=COOH y=1–5, if T=F then y=1;

starting from perfluoroether acylhalides having an average molecular weight (MW) by number in the range 350–5.000, having, respectively, the formula:

wherein

Y', X', m and n have the meaning indicated in

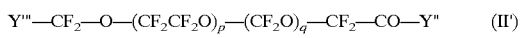

wherein

Y" has the meaning indicated in (I');

Y'''=CO—Y", F;

by reaction with $H_2O_2$ in basic ambient.

The process is carried out at a temperature comprised between −5° C. and +5° C. in a mixture formed by two immiscible liquid phases having a total volume equal to at most ⅔ of the reactor one, kept under stirring so that no emulsions are formed, said liquid phases being the following:

- an organic phase formed by a polyhalogenated solvent having very low ODP, in an higher amount,
- an aqueous alkaline solution containing an excess of hydrogen peroxide with respect to the halide which is added;

said process comprising the following steps:

a) addition of a (per)fluoropolyether monoacyl or diacyl-halide by cooling so that the ΔT thermal increase, with reference to a reactor having an internal volume in the range 50–250 ml cooled by a 2 l volume cryogenic bath having a temperature comprised between −40° C. and −80° C., is in the range 6° C.–20° C. and that when the addition is over, the temperature decreases to the initial one in a time comprised between 0.1 and 5 minutes;

b) reacting, at the initial temperature, for the necessary time ($t_{max}$) to obtain the conversion of 75% of the acylhalide (I'), (II'), determined by quantitative FTIR analysis c) reaction interruption, by stopping stirring and allowing the phases to be separated by maintaining the system at the initial temperature, and recovery of the organic phase containing the perf luoropolyether diacyl-/polyacyl-peroxides.

Preferably in step a) the ratio between the alkali moles and the —CO—Y" functional groups equivalents is comprised between 1.2 and 1.8 and the ratio between the aqueous phase ml volume and the base grams is comprised between 5 and 10; preferably the organic phase volume is half than that of the reactor.

In order to obtain the thermal increases indicated in a), the reactant addition is carried out in a time depending on the perfluoropolyether acylic halides of formula (I') and (II') MW and it ranges from 20 to 30 seconds for the perfluoropolyether acyclic halides having MW in the range 350–800 and it is lower than or equal to 15 seconds for those having a MW in the range 800–5.000.

The polyhalogenated organic solvent is preferably (per)-fluorinated and is preferably selected from $C_6$–$C_{10}$ linear chain perfluoroalkanes, perfluoropolyethers having perfluoroalkylic end groups, optionally containing at one or both end groups an hydrogen atom, said perfluoropolyethers having a low number average molecular weight, preferably in the range 400–1.000. The preferred solvents are perfluoropolyethers having perfluoroalkylic end groups.

The process object of the present invention is feasible both in batch and in a continuous way, and allows to obtain with high yields poly-acylperoxide or diacylperoxide mixtures with EW in the range 350–5.000. Preferably peroxides of formula (II) with equivalent weights (EW) between 1.000 and 2.000, starting from (per)fluoropolyether halides of formula (II') with number average molecular weight 1.000–2.000, are obtained. Preferably diacylperoxides of formula (I) having preferably equivalent weight in the range 350–800 starting from halides of formula (I') with number average molecular weight 350–800, are obtained.

In the reaction product mixtures obtainable starting from (II') the relative amounts of diacyl peroxides and polyacylproxides are related to the hydrogen peroxide excess and, the conditions being equal, with the compound (II') molecular weight.

By using halides of formula (II') with MW in the range 3.000–5.000, diacylperoxides of formula (II) with y=1 are obtained; by using halides of formula (II') with number average molecular weights in the range 350–3.000, dipolyacylperoxides are obtained and in the formula (II) y=1–5 and T=COOH.

With average equivalent weight of the peroxide according to the present invention it is meant the equivalent weight calculated from the molecular weight of the starting acylhalide, subtracted the halogen atomic weight and added that of the oxygen.

The reaction yield is calculated by determining the titre in peroxides of the organic phase by titration with an aqueous titrated solution of sodium thiosulphate in the presence of a 50% w/v potassium iodide aqueous solution.

The (per)fluoropolyether peroxidation reaction yields according to the present invention depend on the parameters indicated in the invention process steps:

the reaction exothermy control to maintain the mixture temperature within the indicated range range. Tests carried out by the Applicant have shown that the yields decrease when the thermal increases are not in the above specified limits;

the time ($t_{max}$) which elapses between the moment when the temperature inside the system returns to the initial one and the moment when stirring is stopped.

The total reaction time is determined from time to time by determining the acylhalide conversion percentage, which is obtained taking samples from the reaction mixture at different times, starting when the addition of the (per)fluoropolyether monoacyl or diacyl-halide of formula (I') or (II'), respectively, begins. More specifically the analysis is carried out by the quantitative FTIR technique, by monitoring the peak area decrease corresponding to the stretching of the compound of formula (I') or (II') acylic groups and determining the ratio with respect to the initial area, the compound weight being the same. The reaction is stopped when this ratio reaches the required value (75% conversion of (I') or (II') at $t_{max}$).

It has been verified that by determining the peroxides concentration in the reaction mixture by titration as indicated above, the reaction time cannot be determined. The concentration of these compounds reaches a maximum after few ten seconds from the reaction beginning and it keeps constant for several minutes. FTIR analyses carried out on samples taken in correspondence of the reaction plateau have shown that the formed peroxide quickly hydrolyzes to carboxylic acid. This compound is also obtained, contemporaneously, by the direct acylhalide hydrolysis. The factor influencing the reaction yields is therefore the acylhalide amount which can still react. It has been verified that the best yields are obtained by stopping the reaction at the 75% of the acylhalide conversion.

It is possible to determine by $^{19}F$ NMR analysis if in the organic phase containing the reaction products, diacylperoxides or polyacylperoxides have been formed, after removing part of the solvent, so as to concentrate the peroxidic fraction. The areas ($A_1$) of the peaks corresponding to the —$CF_2$— groups in alpha position to the end groups (e.g. —$CF_2$—COOH) and those ($A_2$) of the —$CF_2$— groups which are in alpha with respect to the peroxidic group [—$CF_2$—C(O)—O—O—C(O)—$CF_2$]$_n$, are measured. The $A_2/A_1$ ratio allows an evaluation of the y value and therefore to determine if the compound is a diacyl- or a polyacylperoxide.

The invention process gives particularly high yields for the peroxides obtained from acylhalides (II') having number average molecular weight in the range 1.000–2.000.

The Applicant has unexpectedly found that starting from acylhalides having number average molecular weight in the range 350–3.000, the invention process allows to obtain with improved yields products wherein polyacylperoxides are in a higher concentration.

The invention process has been found applicable also to average molecular weights of the starting compounds higher than 2.000, up to 5.000, and the yields are industrially good and better than the processes of the art.

A further object of the invention consists in dipolyacylperoxides of formula (I) and (II).

The (per)fluorinated peroxides obtained by the process according to the present invention are used as chain initiators in (per)fluoroelastomer and thermoplastic polymerizations. These (per) fluorinated peroxides have chemical physical properties such as to result compatible with the polymerization system. Moreover the possibility to determine the half-life times of the peroxide homolitic decomposition on the basis of its equivalent weight allows to select the most suitable operating conditions for the polymerization.

The (per)fluoropolyether (di/poly)acyl peroxides can be used also as modifiers of non fluorinated polymers, such as polyacrylates, to give better surface properties, or as intermediates for agrochemical and pharmaceutical compounds.

The following examples are given only for illustrative purposes of the present invention without limiting it.

EXAMPLE 1

Synthesis of a diacyl- and polvacyl-peroxides Mixture Having Structure (II) (Z-PFPE) EW 1355.

The used equipment consists in a 200 ml glass flask having 4 ground necks equipped with nechanical blade stirrer, condenser, dropping funnel and thermometer. The equipment is assembled so that the flask can be dipped in a 2 l refrigerant bath and at a temperature between –40° C. and –70° C.

In the flask, at room temperature, 87.3 mmoles of finely milled NaOH in 23.5 ml of distilled $H_2O$ (equivalent to 6.75 ml $H_2O$/g NaOH) are dissolved; to this solution 35 mmoles of $H_2O_2$ at 57.5% w/w and 100 ml of perfluorohexane $C_6F_{14}$ are added. The solution is cooled at 0° C. under stirring (1512 rpm). In 15 seconds 29.1 mmoles of perfluoroether diacylchloride Z-PFPE of formula (II') wherein p/q=0.5–2 MW 1374, are dropped. By dipping the reactor in a bath at –40° C. the reaction mixture exothermy does not exceed 9° C. When the exothermy is ended, the temperature returns to 0° C. in 1.5 minutes. Stirring is continued at 0° C. for a time $t_{max}=1$ minute so as to obtain 75% of conversion (determined by FTIR analysis, peak at 1804 cm$^{-1}$) of the acylchloride. At this point stirring is stopped and the flask content is poured in a separatory funnel, previously cooled at 0° C. After separation of the phases the organic phase is recovered, which is anhydrified by sodium sulphate and filtered in a "Sartorius" pressure filter equipped only with prefilter. 167 g (density=1.72 g/ml) of clear organic solution having a peroxide titre of 0.28 g peroxide/ml solution, equivalent to 27.5 g of acyl peroxide having a calculated average EW 1355. The yield, calculated by the equivalent weight is 70%.

The $t_{max}$ influence on the acyl peroxide yield is shown in Table 1.

EXAMPLES 2–3 (comparative)

Synthesis of a diacyl- and polvacyl-peroxides Mixture Z-PFPE MW 1355 in Different Solvents One proceeds as in Example 1. The addition time was 15 seconds while the $t_{max}$ was fixed at the time when the acylchloride conversion was 75%. In Example 2 a perfluoropolyether (PFPE) having MW 800 is used as a solvent. In the comparative Example 3 the solvent is Freon® 113 (high ODP).

| Example | Solvent | Yield |
|---------|---------|-------|
| No. 2   | PFPE MW 800 | 73% |
| No. 3   | Freon ® 113 | 55% |

EXAMPLES 4–5 (comparative)

Influence of the Addition Time on the Yields of the Obtained di-polvacylperoxide Product with EW 1355

Example 1 was repeated carrying out the reactant addition in a total time over the 20 seconds limit: 25 seconds in Example 4 and 300 seconds in Example 5.

| Comparative example | Addition time acylchloride (seconds) | Yield |
|---------------------|--------------------------------------|-------|
| No. 4 | 25 | 32% |
| No. 5 | 300 | 6% |

In Example 4 the yields are 46% of those of Example 1, in Example 5 about 9%.

EXAMPLE 6

Synthesis of a polyacyl-peroxides Mixture Z-PFPE EW 529 and Determination of the Molecular Weight of the Obtained Product The same equipment of Example 2 is used. 218.7 mmoles of NaOH dissolved in 59.1 ml of water are introduced. 87.5 mmoles of H$_2$O$_2$ at 57.5% and 100 ml of C$_6$F$_{14}$ are added to the solution. 72.9 mmoles of perfluoroether diacyl chloride Z-PFPE having MW=548.8, are dropped in the reaction mixture in 25 seconds. The reaction exothermy is controlled so that the temperature rise in the mixture is of +11° C. The $t_{max}$ is of 3.3 min. at 0° C. The mass is worked as described in Example 2. A product having a calculated average EW 529 is obtained. The compound contains polyacylperoxides (Ex. 1).The peroxide yield is 72%.

The y parameter value in formula (II), and therefore the compound equivalent weight, was determined as follows.

The poly-acylperoxide halflife ($t_{1/2}$) was determined with the following method. 16–17 g of the peroxide were dissolved in 150 ml of C$_6$F$_{14}$. 1.5 ml portions of this solution are distributed in test-tubes, which are then closed and thermostated at 20° C. Starting from the zero time (experiment beginning), and then at regular intervals, the peroxide quantitative determination is carried out by titration with thiosulphate, by using 5–6 different samples at a time and calculating an average value of the obtained titres. Then a graph is drawn, reporting in ordinates the solution concentration in g of peroxide/ml of solvent and in abscissas the time, expressed in minutes. In this way the $t_{1/2}$ at 20° C. has been determined, which resulted of 4606 minutes.

The compound taken as a reference is a diacylperoxide having the structure (I) wherein Y'=OCF$_3$ PE=1580, prepared from the corresponding perfluoroether monoacylchloride (I') according to the process of Example 2. The $t_{1/2}$ value determined with the above mentioned method was of 4500 minutes.

The substantial equality of the two peroxides $t_{1/2}$ means that the molecular weight of the polyacylperoxide with PE 529 is very close to that of the diacyl peroxide taken as a reference. i.e. 3160. Therefore they parameter in the formula of the compound (II) has a value in the range 1–5. This shows that the obtained peroxide is a polyacylperoxide.

EXAMPLES 7–9 (comparative)

Effect of the Thermal Rise on the Reaction Yields

Example 6 was repeated changing the cooling system to allow ΔT thermal rises respectively below and over the +6–+20° C. limits. The ΔT values were respectively 3° C., 26° C., 32° C. (initial temperature 0° C.). The following comparative Examples 7–9 show that the previously mentioned thermal increase give rise to an yield decrease.

| Comparative Example | Thermal rise (° C.) | Yield |
|---------------------|---------------------|-------|
| No. 7 | +3  | 35% |
| No. 8 | +26 | 40.2% |
| No. 9 | +32 | 35% |

In particular from Example 7 it results that by cooling the system in reaction so that the temperature rise is of 5° C., the yields are half than those of Example 6.

EXAMPLE 10

Synthesis of a polyacyl-peroxides Mixture Z-PFPE with EW 2204

The same equipment of Example 1 is used. 54 mmoles of NaOH dissolved in 59.1 ml of water are introduced in the flask. 21.6 mmoles of H$_2$O$_2$ at 57.5% and 80 ml of a C$_6$F$_{14}$–C$_{10}$F$_{22}$ mixture are added to the solution. 18 mmoles of perfluoroether diacyl chloride Z-PFPE having MW=2223, are dropped in the reaction mixture in 15 seconds. The reaction exothermy is controlled so that the temperature rise in the reaction mixture does not exceed +10° C. The $t_{max}$ results to be 3.5 min. at 0° C. The organic phase is recovered as described in Example 2. The peroxide yield is 71%.

EXAMPLE 11

Synthesis of diacyl-peroxide Z-PFPE with EW 4550

The equipment of Example 2 is used. 19.7 mmoles of NaOH dissolved in 5.3 ml of water are introduced in the flask. 7.88 mmoles of $H_2O_2$ at 57.5% and 60 ml of a $C_6F_{14}$ are added to the solution. 6.57 mmoles of perfluoroether diacyl chloride Z-PFPE having MW=4569, are dropped in the reaction mixture in 15 seconds. The reaction exothermy is controlled so that the temperature rise in the mixture is of +9° C. The $t_{max}$ is of 6 min. at 0° C. The organic phase is recovered as described in Example 2. 2 g of product are obtained, EW calculated=4550. The peroxide yield is 24.3%.

EXAMPLE 12

Synthesis of diacyl-peroxide Having Structure (I) Having Y'=Cl EW=501

The equipment of Example 2 is used. 76.2 mmoles of NaOH dissolved in 20.6 ml of water are introduced in the flask (200 ml). 60.79 mmoles of $H_2O_2$ at 57.5% and 125 ml of a $C_8F_{18}$ are added to the solution. 50.36 mmoles of perfluoroethereal acyl chloride having structure (I') with Y'=Cl having MW=547, are dropped in the reaction mixture in 15 seconds. The reaction exothermy is controlled so that the temperature rise in the mixture does not exceed +11° C. The $t_{max}$ is of 0.1 min. at 0° C. The organic phase is recovered as described in Example 1. The product is a diacylperoxide. The yield is 76%.

TABLE 1

Effect of the $t_{max}$ on the diacyl peroxide yield of Example 1

| $t_{max}$ (min) | Yield % |
|---|---|
| 0.1 | 45 |
| 3 | 65 |
| 8 | 50 |
| 12 | 35 |
| 20 | 25 |

What is claimed is:

1. A process for obtaining (per)fluoroether acylperoxides having an average equivalent weight (EW) in the range 350–5000, having the formula:

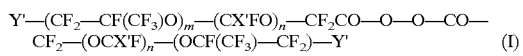
(I)

wherein

Y'=Cl, $OR_f$ wherein $R_f$ is a $C_1$–$C_3$ perfluoroalkyl;

m, n are integers such that the average equivalent weight of (I) is in the range of 350–5000 and m/n≧40;

X'=F, $CF_3$;

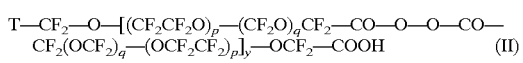
(II)

wherein y is an integer comprised between 1 and 5;

p and q are integers such as to give the above mentioned EW and p/q=0.5 to 2.0;

T=COOH, F with the proviso that when T=COOH y=1–5, when T=F then y=1;

starting from perfluoroether acylhalides having number average molecular weights (MV) in the range of 350–5000, having, respectively, the formula:

(I')

wherein Y', X', m and n have the meaning defined in (I);

Y"=Cl, F;

(II')

wherein

Y" has the meaning defined in (I'); Y'''=CO—Y", F;

by reaction with $H_2O$ in basic conditions at a temperature in the range –5° C. to 5° C. in a mixture formed by two immiscible liquid phases having a total volume equal to at most ⅔ of that of the reactor, kept under stirring so that no emulsions are formed, said liquid phases being:

an organic phase formed by (per)fluorinated solvents selected from $C_6$–$C_{10}$ linear chain perfluoroalkanes, perfluoropolyethers having perfluoroalkylic end groups, optionally containing at one or both end groups a hydrogen atom, said perfluoropolyethers having a number average molecularweight in the range of 400–1000;

an aqueous alkaline solution containing an excess of hydrogen peroxide relative to the halide added;

said process comprising the following steps:

a) adding a (per)fluoropolyether monoacyl or diacylhalide, to a reactor having an internal volume in the range 50–250 ml cooled with a 2 liter volume cryogenic bath having a temperature comprised between –40° C. and –80° C., so that the ΔT thermal rise is in the range 6° C. to 20° C., and such that when the addition is complete the temperature decreases to the initial temperature in a time period in the range of 0.1–5 minutes;

b) conducting the ensuing reaction with stirring at the initial temperature, for a time ($t_{max}$) to obtain the conversion of 75% of the acyl-halide of formula (I') or (II'), said conversion determined by quantitative FTIR; and c) interrupting the reaction by stopping stirring and allowing the phases to be separated by maintaining the system at the initial temperature, and subsequently recovering the organic phase containing the perfluoropolyether diacyl/polyacyl-peroxides.

2. The process according to claim 1 wherein in step a) the ratio between the alkali moles and the equivalents of —CO—Y" functional groups is in the range 1.2–1.8 and the ratio between the aqueous phase ml volume and the base grams is in the range 5–10 and the organic phase volume is half than that of the reactor.

3. The process according to claim 1 wherein in step a), the reactant addition is preformed in a time ranging from 20 to 30 seconds for (per)fluoropolyether acyihalides (I') and (II') having MW in the range 350–800 and the reaction time is less than or equal to 15 seconds for (per)fluoropolyether acylhalides (I') and (II') having a MW in the range 800–5000.

4. The process according to claim 1 wherein the solvent is a perfluoropolyether.

5. The process according to claim 1, which is continuous or batch.

6. The process according to claim 1, wherein the (per)fluoroether acylperoxides are obtained having the formula (II) with equivalent weights (EW) in the range 1000–2000 starting from (per)fluoropolyether acylhalides of formula (II') with a number average molecular weight in the range of 1000–2000.

7. The process according to claim 1 wherein (per)fluoropolyether acylperoxides are obtained having the formula (I) with equivalent weight from 350 to 800 starting from (per)fluoropolyether acylhalides of formula (I') having number an average molecular weight in the range of 350–800.

8. The process according to claim 1 wherein in the reaction products obtained starting from the (per)fluoroether acylhalides of formula (II') the relative amounts of diacyl peroxides and polyacylperoxides are in relation with the used hydrogen peroxide excess, and, the conditions being the same, with the compound (II') molecular weight.

9. The process according to claim 1, wherein by using (per)fluoropolyether acylhalides of formula (II') having MW in the range 3000–5000, (per)fluoropolyether acylperoxides of formula (II) wherein $y=1$ are obtained; and by using (per)fluoropolyether acylhalides number average molecular weights in the range 350–3000, polyacylperoxides mixtures are obtained and in formula (II) wherein $y=1-5$ and T=COOH.

10. The (per)fluoropolyether acylperoxides of formula (I) wherein Y'=Cl and the (per)fluoropolyether acylperoxides of formula (II) of claim 1.

* * * * *